May 7, 1935.    J. KNELL    2,000,850
OUTLET BOX AND CABLE CLAMP
Filed Feb. 19, 1930
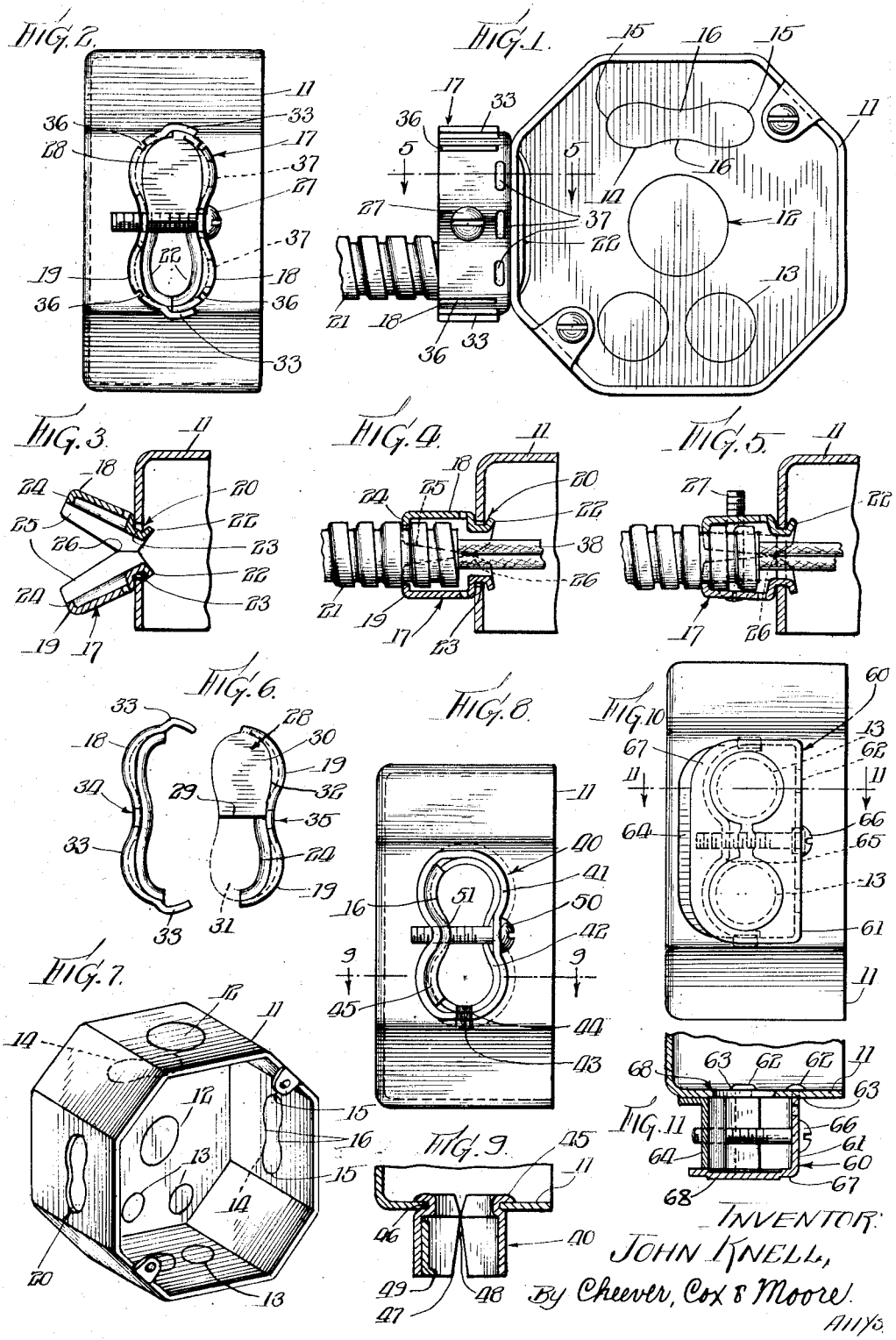
INVENTOR
JOHN KNELL,
By Cheever, Cox & Moore
Attys.

Patented May 7, 1935

2,000,850

UNITED STATES PATENT OFFICE 2,000,850

OUTLET BOX AND CABLE CLAMP

John Knell, Aurora, Ill., assignor to All-Steel-Equip Company, Aurora, Ill., a corporation of Illinois Application February 19, 1930, Serial No. 429,493

1 Claim. (Cl. 247—25)

This invention relates in general to outlet boxes and particularly to a combination outlet box and clamp. More specifically, the invention relates to a clamp for holding a conduit or cable in fixed position relative to the outlet box.

The primary object of the invention is to provide an outlet box in combination with a particular type of clamping means which cooperates with the outlet box for holding a conduit or flexible cable or pipe in rigid operative connection with the outlet box.

Another object is to provide a new and improved cable clamp which has interlocking or interfitting engagement with an outlet box for clamping a conduit or cable to an outlet box.

A further object is to provide a new and improved universal outlet box whereby fittings of various kinds may be connected to the outlet box for securing a conduit or cable to the outlet box.

A still further object is to provide a clamp of novel construction which is provided with a single fastening means whereby tightening of the fastening means causes the clamp to interlock rigidly with the outlet box and to bite into the cable for rigidly connecting the cable to the outlet box.

Numerous other objects and advantages will be apparent throughout the progress of the following specification.

The invention comprises in general an outlet box provided with an elongated opening rounded at its ends and contracted at its inner portion to receive clamping means whereby a plurality of conduits or cables made from flexible cable material may be fastened securely to the outlet box. The clamp is preferably made in two parts having out-turned flanges which are adapted to extend through the elongated slot and engage the inner side of the outlet box. The clamp is provided with a groove into which the metal of the outlet box is received. The outer end of the clamp is provided with an inturned flange for biting into the cable. The sides of each part of the clamp are provided with cam surfaces whereby tightening of a single fastening means will cause the inturned lips to bite into the cable, and the outer flanges to have wedge engagement with the edges of the box about the elongated slot. One part of the clamp is provided with a lip or closure which is cut partway through. This lip or closure is preferably made integral with the clamp and turned over from the body thereof. The lip or cover is cut partly through the metal, as clearly indicated in the drawing, and answers the same purpose as a knock-out. If only one cable is used, one of the lips or closures is knocked off to permit the cable to extend through this opening. If two cables are used, both of the lips or closures are knocked off, and if no cable at all is to enter the side of the box where the clamp is connected, the lips or closures are left on the clamp, it being one of the objects of the invention to provide outlet boxes with the clamps arranged in position. When outlet boxes are placed upon the market with the clamp fastened thereto, it is an easy matter for the electrician or operator to loosen the screw, insert the cable after a lip has been removed, and then tighten the fastening means.

The accompanying drawing illustrates a selected embodiment of the invention and the views therein are as follows:

Fig. 1 is a detail plan view of the improved outlet box and clamp, the clamp receiving a cable.

Fig. 2 is a side elevation of the clamp connected to an outlet box.

Fig. 3 is a detail sectional view of the clamp and outlet box showing the manner in which the clamp is set into the box.

Fig. 4 is a similar view showing the clamp arranged in the box and engaging a cable, the fastening means being omitted.

Fig. 5 is a view similar to Figs. 3 and 4 taken on the line 5—5 of Fig. 1 showing the clamp operatively engaging the outlet box and clamp after the fastening means have been tightened.

Fig. 6 is a detail view showing the two parts of the clamp.

Fig. 7 is a detail perspective view of the improved universal outlet box.

Fig. 8 is a detail view showing a modified form of the clamp mounted on an outlet box and which is made in one piece.

Fig. 9 is a detail sectional view on the line 9—9 of Fig. 8.

Fig. 10 is a detail elevation showing another modified form of clamp.

Fig. 11 is a detail sectional view on the line 11—11 of Fig. 10.

Referring to the drawing and particularly Figs. 1 to 7 thereof, 11 designates an outlet box provided with a plurality of knock-outs 12, 13 and 14. The knock-out 12 is the usual large circular knock-out through which a conduit or B. X. cable may extend in a manner well known in the art. The knock-outs 13 are smaller than the knock-out 12 and are used when smaller conduits or cables are employed. The knock-outs 14 are elongated as shown, have rounded ends 15, and are narrowed inwardly between their ends as designated at 16, Fig. 1.

A clamp 17 made up of two pieces 18 and 19, is adapted to engage a slot 20 formed in the outlet box 11 when a knock-out 14 is removed for holding a cable 21 in rigid position relative to the outlet box. The parts 18 and 19 are provided with outturned flanges 22 which are adapted to extend through the opening 20 and engage the inside of the outlet box. A groove 23 is arranged adjacent the flanges 22 to receive the outlet box about the slot or opening 20. The outer ends of the parts 18 and 19 are provided with downturned flanges 24 which are adapted to engage the cable 21 for holding the cable rigidly in position relative to the box 11. The sides 25 of the two parts of the clamp are provided with cams 26, Fig. 3, for causing the inner ends of the parts to spread apart and wedgingly engage the outlet box when the fastening means or screw 27 is tightened.

The clamp 17 composed of the two members 18 and 19, is preferably stamped from sheet metal, and one part, in the present case indicated as the part 19, is provided with a closure or lip 28 which is preferably made integral with the part 19, Fig. 6. This closure is preferably cut along the line 29, Fig. 6, to provide a pair of independent or separate closures 30 and 31 respectively. The separate closures 30 and 31 are cut partway through the line 32, whereby they may be easily removed or knocked off from the member 19. The cut along the line 32 is preferably located in such a position so that when one of the separate lips is knocked off from the member 19, an inturned flange 24 is provided. In other words, the separate closures 30 and 31 are cut in such a manner so that when they are removed from the part 19, a flange 24 will be provided. In the present description of the closure 28, whereby the separate or independent closures 30 and 31 are provided, it has been stated that the part 19 is provided with the closure. It is to be understood, however, that either part may be provided with the closure and they may be reversed inasmuch as the parts and the slot 20 are symmetrical.

One part of the clamp 17 is provided with outwardly extending lips 33, Fig. 6, to receive the other part of the clamp to hold them together and to prevent a lateral displacement of one part relative to another. While these lips 33 are shown in the present instance as being arranged on the part 18, they may be arranged on the part 19, if so desired. The two parts 18 and 19 are provided with alined holes 34 and 35 respectively, Fig. 6, to receive the fastening means or screw 27. The hole 35 is slightly larger than the stem of the screw but smaller than its head, while the hole 34 is preferably made screw-threaded so it will not be necessary to have a separate and independent cooperating means, such as a nut, for holding the two parts of the clamp together.

The parts 18 and 19 may be provided with slots or cut-outs 36, as clearly shown in Figs. 1 and 2, to render the parts resilient so that the parts may be sprung when the screw 27 is tightened. These slots or cut-outs also enable the parts to spring back to normal position when the screw 27 is loosened. In other words, these slots permit the material to "give" when the fastening means are tightened as the metal from which the parts are made is relatively thick and would not yield quickly to pressure applied against them upon tightening the screw. Peep holes 37 are provided in both the parts to permit the conductors 38 to be seen from the outside of the clamp. These peep holes also render the parts of the clamp somewhat resilient and cause the action of the screw 27 to be transmitted more readily to the places where the clamping action takes place.

In Figs. 8 and 9 there is shown a modified form of clamping means 40 which has its outer shell 41 made in one piece. The shell 41 has a loose inner part 42, and the shell and loose part are slit at 43 and 44 respectively to permit sufficient resiliency or springiness for inserting the outturned flanges 45 on the shell into one of the slots 20. The slits in the shell 41 and the member 42 permit the shell to be contracted sufficiently to be inserted into a slot 20 and the part 42 to be acted upon to be contracted for biting into a cable. The shell 41 of the clamping means is provided with a groove 46 into which the metal surrounding the slot 20 is received after the flanges on the shell extend through the slot. Sides 47 and 48 of the clamping member 40 may be provided with cam surfaces similar to the previously mentioned cam surfaces 26, whereby the flanges 45 on the shell 41 will wedgingly engage the outlet box and the inturned flanges 49 on the part 42 will bite into the cable. Fastening means 50, similar to the fastening means 27, extend through the shell 41 and threadedly engage the part 42 at 51 for drawing the part 42 together to cause it to grip a cable.

Instead of having the out-turned flanges 45 formed on the shell and inserting these flanges through the slots, these holding flanges may be formed by peening over a part of the material to fix the shell rigidly to the box. If it is the intention, as is probably the case, to furnish an outlet box with a clamping member already fastened thereto, the peening construction would be preferred. This latter construction is formed by providing the shell with an outwardly extending portion of material which extends through the slot and then this material is peened over to fix the shell to the box.

Another modified clamp 60 is shown in Figs. 10 and 11 and may be preferred over the other types of clamps shown. The clamp 60 comprises a part 61 which is permanently fastened to the box 11 by clinching over the legs 62 which protrude through holes 63 in the box. The other part 64 of the clamp is provided with a cable engaging flange 65 which bites into the cable upon tightening the fastening means 66. One part of the clamp 60, preferably the part 61, has a closure 67 turned over therefrom and this closure is provided with knock-outs 68 for the cable. The clamp 60 herein shown is best adapted for use with a pair of openings which are provided by removing the box knock-outs 13. The knock-outs 68 are so made that, when they are removed, a flange is provided which cooperates with the flange 65 for holding the cable tightly in position when the fastening means 66 are tightened. This modified form of clamp is not claimed in the present application as the same is disclosed and claimed in applicant's copending application, Serial No. 522,553, filed March 14, 1931.

The invention comprises a universal outlet box which is provided with a new and improved means for fastening a cable rigidly in position relative to an outlet box. The particular form and construction of the clamps herein shown, provide for rigidly fastening a clamp to a box and a cable or cables to the clamp. The impinging or pressing action of the outer end of the clamping means causes the cable to be held tightly and securely in position in the clamp. The clamp is preferably made to accommodate a plurality of cables and the manner in which the closures are formed permits the clamping means to be employed should only one cable be required.

Changes may be made in the form, construction, and arrangement of the parts without departing from the spirit of the invention or sacrificing any of its advantages, and the right is hereby reserved to make all such changes which fairly fall within the scope of the following claim.

The invention is hereby claimed as follows:

In combination, a universal outlet box comprising a plurality of different shaped knock-outs for permitting a conduit or cable to be operatively connected to the box, at least one of said knock-outs being elongated, an elongated slot being provided when an elongated knock-out is removed, said elongated slot capable of receiving a pair of cables leading to the box, a clamping member having a part receivable in said elongated slot, said clamping member having means adapted to receive and support a pair of cables, and means for fastening a cable to said clamp and said clamp to said box.

JOHN KNELL.